Patented May 1, 1934

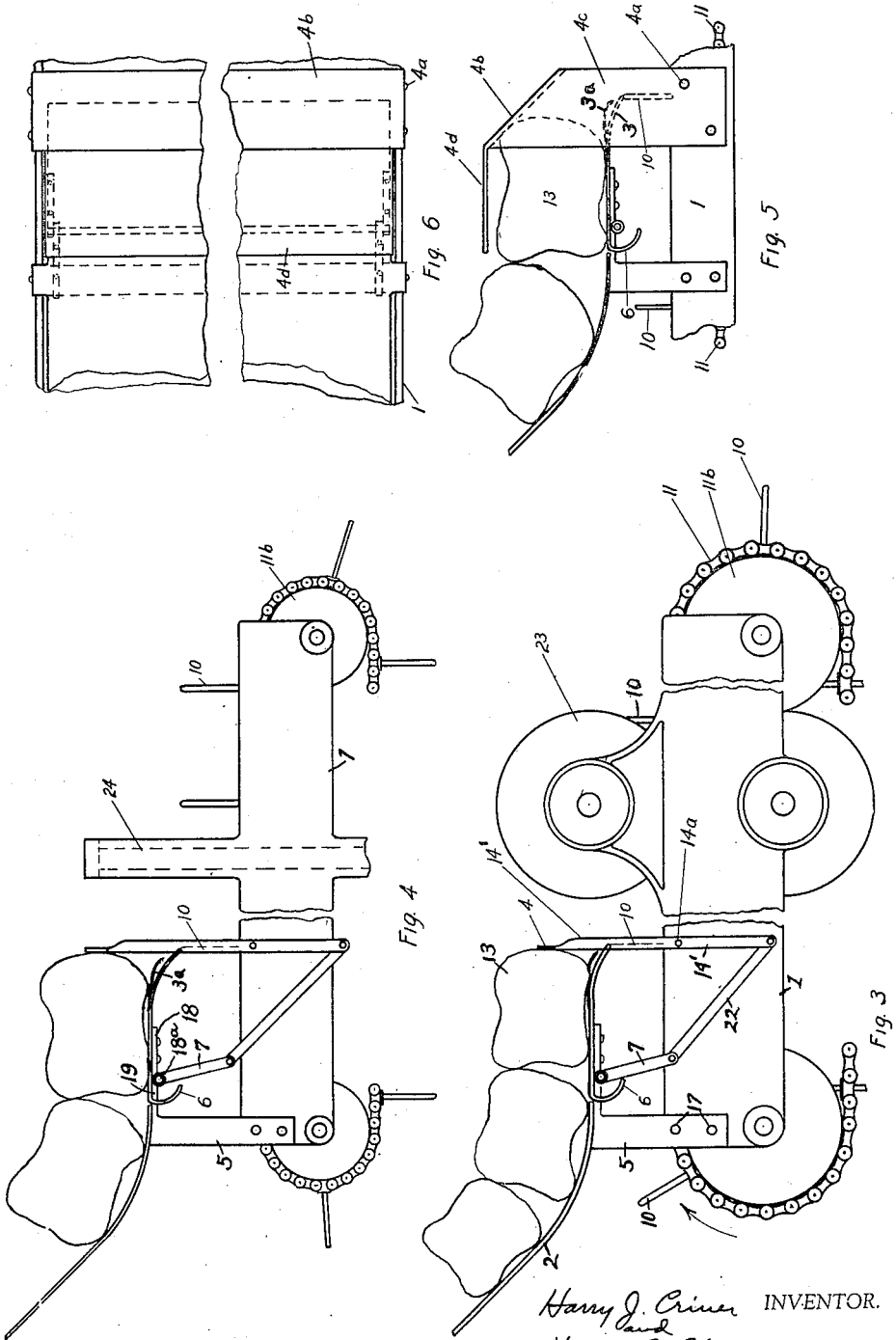

1,957,321

UNITED STATES PATENT OFFICE 1,957,321

FEEDING APPLIANCE FOR BREAD SLICING MACHINES

Harry J. Criner and Harry E. Criner, Davenport, Iowa, assignors, by mesne assignments, to The Micro Corporation, Bettendorf, Iowa, a corporation of Delaware Application August 29, 1931, Serial No. 560,144

12 Claims. (Cl. 198—26)

Our invention relates to appliances for feeding entire loaves of bread successively and rapidly to bread slicing machines and is adaptable to various types of slicing machines intended to slice a whole loaf of bread, particularly freshly baked bread, either at a single operation or by passing same through a plurality of series of cutting blades.

The objects of our invention are:

1. To provide an appliance comprising a chute on which loaves of bread may be placed manually or by mechanical means, together with devices which will take a single loaf of bread at a time from the chute and deposit it in the desired position upon a conveyor to be conveyed to the slicing means and also to provide means which will check the movements of the following loaves until a given loaf has been properly positioned upon the conveyor and moved away from the positioning devices;

2. To provide a simple, effective appliance for depositing successive loaves of bread in a given position upon a moving conveyor;

3. To provide means to prevent the overturning or upsetting of loaves of bread while being deposited upon a conveyor to be carried to the slicing means of the bread slicing machine.

We attain these objects by the means illustrated in the accompanying drawings, in which,—

Figure 3 is a side elevation with portions broken away as applied to a rotary cutting machine having opposed series of cutting brades;

Figure 4 is a side elevation with portions broken away, of our machine, as applied to a cutting machine having vertical reciprocating blades;

Figure 5 is a detail side elevation of an alternative form of stop;

Figure 6 is a detail showing a top or plan view of Figure 5, with portions broken away.

Similar numerals refer to similar parts throughout the several views.

Our apparatus comprises side frames, 1, which may be attached to or form a part of the frame of a slicing machine. A bread chute, 2, preferably formed of a broad sheet of smooth metal, sloping downwardly and with a suitable curve near the lower end thereof, is mounted upon a vertical support comprising a cross member, 16, with legs, 5, formed integral therewith and attached to the side frame by rivets, 17, or other suitable means, and rear supports, 20, the upper ends of which are secured to the chute, 2, by rivets, 21, and the lower ends of which are riveted to the side frames, 1, by rivets, 21a, or other suitable means.

Hinge members, 19, are formed integral with the lower end of the chute, 2, or cross member, 16, or suitably united thereto, and are united by hinge pivots, 18a, to corresponding hinge members, 18, united to or formed integral with a trap door or trip member, 3. The hinged pivots, 18a, are preferably rigidly secured in the hinge members, 18, and are revolvable in the hinge members, 19. The pivots, 18a, project downwardly and respectively have rigidly united to their projecting ends, the upper ends of the levers, 7. This trap door is preferably formed of sheet metal similar to the chute and extends transversely across the lower end of the chute, the lower end of the chute being provided with a hinge member at each side. The rear end of the trap door, 3, referring to the left of Figure 2, as the rear, has a curved extension, 6, extending downwardly from the rear therefrom. The hinge pivots, 18a are located just below the level of the lower end of the chute, 2, so that when the trap door, 3, is in horizontal position, it forms a continuation of the chute, 2.

A plurality of series of carrier arms, 10, mounted upon sprocket chains, 11, are provided. When used with rotary cutting machines having opposed series of cutters spaced apart, cross-members or flights, 9, are united to the carrier arms, 10, and the outer ends of the flights, 9, may travel in grooves, 11a, formed in the inner faces of the side frames, but when used as a feeder for reciprocating bread slicers, no cross-members, 9, are used, but the carrier arms are severally attached to corresponding sprocket chains as shown in Figure 4, there being a plurality of chains corresponding to the spaces between the reciprocating cutting blades.

In Figure 4 we have shown sprocket chains extending through the series of reciprocating blades, but it is obvious that where other forms of conveyors are used to carry the bread through the series of reciprocating blades, our appliance may be used to deposit the loaves of bread successively upon such conveyors.

Figure 1:
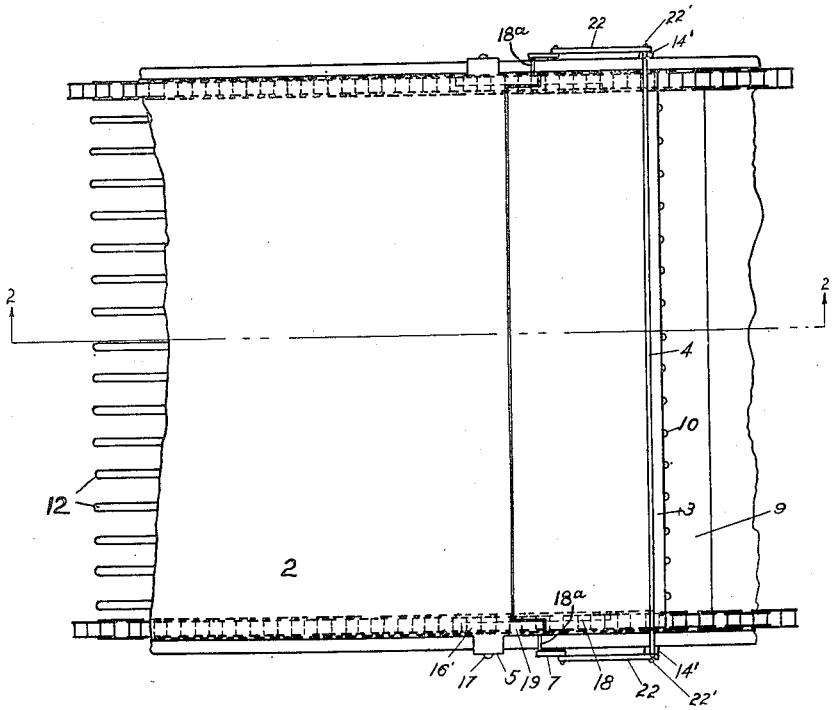
Figure 1 is a plan view of our appliance showing a portion of the chute, 2, broken away.
Figure 2:
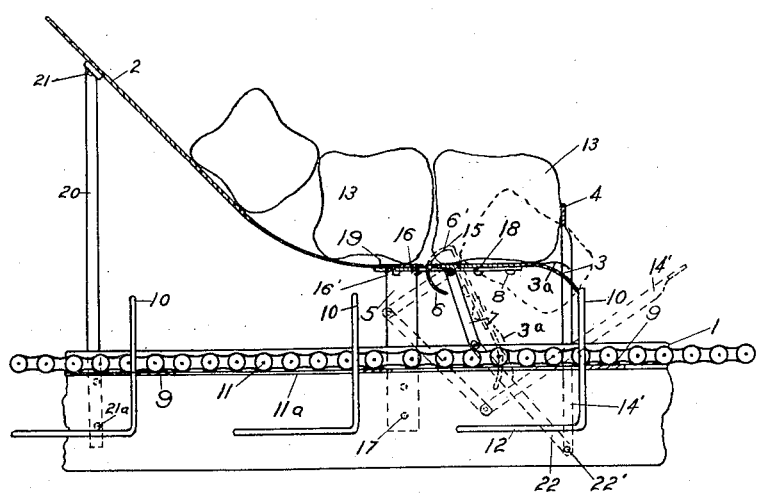
Figure 2 is a longitudinal vertical section of our feeding appliance on the line 2—2 of Figure 1, but omitting parts of the conveyor and conveyor sprockets.

The trap door, 3, when unsupported, will swing downwardly as shown in dotted lines in Figure 2 so that the rear thereof will form a stop or detent for the loaves of bread coming down the chute, 2. As the sprocket chain, 11, progresses in the direction shown by the arrow, the carrier arms, 10, will successively come in contact with the trap door, 3, and will raise it into the horizontal position, in which position the weight of the loaves of bread in the chute, 2, will force the lowest loaf from the chute, 2, onto the trap door, 3.

As soon as a given series of carrier arms, 10, pass the front end of the trap door, 3, the trap door will swing downwardly into the position shown in dotted lines in Figure 2 and the loaf of bread resting thereon will be tilted forwardly and come in contact with the upper ends of the adjacent carrier arms, 10. As the sprocket chain, 11, moves forwardly, the loaf of bread will drop downwardly on the horizontal portion, 12, of the carrier arms, 10.

The lower or forward end of the trap door, 3, is preferably formed with a plurality of very light springs, 3a, which act to adjust the loaf forwardly upon the carrier arms until the front side of the loaf is in contact with the vertical portion of the arms, 10.

In feeding bread to a cutting machine, we prefer to turn the loaves on their side in such a position that the top of each loaf will be the first portion to reach the cutting blades, as the top crust is usually thinner and easier to cut than the bottom crust and this presentation of the loaves will permit a smooth slicing thereof.

In order to prevent the loaves of bread traveling too far upon the trap door, 3, when loaded thereon, we provide a stop, 4, which comprises a cross-member supported by arms, 14', and these arms, 14', are pivoted to the side frames, 1, by pivots, 14a. To the lower ends of the arms, 14', we attach links, 22, the upper ends of which are pivotally connected to the lower ends of links, 7, the upper ends of which are united to the trap door, 3, so as to move therewith. Accordingly, when the trap door, 3, falls to the position shown in dotted lines in Figure 2, the links, 7 and 22, will fall into the position also shown in dotted lines, turning the lever, 14', into the position shown in dotted lines in that figure.

This turning movement will draw the crossbar, 4, forwardly so as to release the loaf of bread, 13, so that the advancing face of the loaf will drop into contact with the upper ends of the carrier arms, 10, and thence downwardly upon the horizontal portion, 12, of the carrier arms which will carry it to the cutting blades, 23.

When the succeeding set of carrier arms, 10, come into contact with the trap door, 3, the trap door will be lifted to the horizontal position and will carry the links, 7 and 22, and the lever, 14', to the position shown in Figure 3.

In Figure 5 we have shown an alternative form of stop which is stationary, in which a crossbar, 4b, is mounted upon vertical members, 4c, which are secured to the side frames, 1, by rivets, 4a, or other suitable means, and the crossbar, 4b, is preferably formed with a horizontal extension, 4d, which extends transversely across the machine and will prevent the loaves of bread, 13, from being displaced upwardly.

The sprocket chains, 11, may be driven by sprocket wheels, 11b, which in turn may be driven by suitable belting or gearing from the prime mover which operates the slicing machine or by a separate motor as desired. We make no claim for any particular form of driving apparatus.

In the operation of our device, the bread is placed upon the chute, 2, by either manual or mechanical means as desired, and the force of gravity carries it downwardly, it being contemplated that there will be sufficient loaves upon the sloping portion of the chute at all times so that their weight will be sufficient to drive the front or leading loaf from the chute onto the trap door whenever the trap door is swung to its horizontal position, but the weight of the loaves upon the chute will not be sufficient to drive them past the curved portion, 6, of the trap door when it is in the upset position shown in dotted lines in Figure 2.

As the chute, 2, is loaded with loaves of bread, the machine is started up and as the sprocket chains move forward, each successive series of carrier arms, 10, first swing the trap door, 3, into the horizontal position and then release it.

As the bread is carried forward on the trap door, 3, in horizontal position, it comes in contact with the stop, 4 or 4a, which detains it until the trap door is tripped or released from contact with a given series, 10, of the carrier arms. As the trap door swings downwardly, the links, 7 and 22, move the levers, 14', upon the pivots, 14a, so as to carry the crossbar, 4, away from the loaf of bread and allow it to tilt forwardly and downwardly with the trap door, 3, and as the arms, 10, continue to move forward, the springs, 3a, will contact with the rear of the loaf of bread as it drops and move it forwardly against the upright portion of the arms, 10, the loaf in the meantime dropping until it rests upon the horizontal portion, 12, of the arms, 10, or upon any other conveyor which may be used with this charging device.

As the next succeeding series of arms, 10, come in contact with the trap door, 3, they raise it to the horizontal position and the operation just described is repeated.

We do not limit our invention to machines using any particular form of conveyor or using any particular form of feeding apparatus to carry the bread to and through the cutting blades, for it is obvious that our invention may be used for charging various forms of conveyors and feeding devices which carry the bread to and through the cutting blades. Nor do we claim any particular form of conveyor separately and apart from the charging apparatus shown in the drawings.

We claim:

1. A feeding appliance for bread slicing machines comprising a frame, a conveyor mounted in the frame, a chute sloping downwardly toward the conveyor suitably mounted upon the frame, a trip member pivotally mounted upon the frame adjacent the lower end of the chute, said trip member being pivoted at a point spaced forward of the lower end of the chute and forming a continuation of the chute when in horizontal position, and having its rear end recurved to form a stop, means united to the conveyor to successively engage the trip member when in its vertical position, raise it to a horizontal position, and then release it, stop levers pivoted medially to the side frames, a stop extending transversely of the machine and united to the stop levers, trip levers rigidly united to the trip member and links connecting the stop levers to the trip levers.

2. A feeding appliance for bread slicing machines comprising a frame, a conveyor mounted in the frame, a chute sloping downwardly toward the conveyor suitably mounted upon the frame, a trip member pivotally mounted upon the frame adjacent the lower end of the chute, said trip member being pivoted at a point spaced forward of the lower end of the chute and forming a continuation of the chute when in horizontal position, and having its rear end formed into a stop, means united to the conveyor to successively engage the trip member when in its vertical position, raise it to a horizontal position, and then release it, stop levers pivoted medially the side frames, a stop extending transversely of the machine and united to the stop levers, trip levers rigidly united to the trip member and links connecting the stop levers to the trip levers.

3. A feeding appliance for bread slicing machines comprising a frame, a conveyor mounted in the frame, a chute sloping downwardly toward the conveyor suitably mounted upon the frame, a trip member pivotally mounted upon the frame adjacent the lower end of the chute, said trip member being pivoted at a point spaced forward of the lower end of the chute and forming a continuation of the chute when in horizontal position, and having its rear end recurved to form a stop, a plurality of arms united to the conveyor to successively engage the trip member when in its vertical position, raise it to a horizontal position, and then release it, stop levers pivoted medially to the side frames, a stop extending transversely of the machine and united to the stop levers, trip levers rigidly united to the trip member and links connecting the stop levers to the trip levers.

4. A feeding appliance for bread slicing machines comprising a frame, a conveyor mounted in the frame, a chute leading to the conveyor suitably mounted upon the frame, a hinged trip member pivotally mounted upon the frame adjacent the lower end of the chute pivoted at a point spaced forward of the forward end of the chute and forming a continuation of the chute when in loaded position, means united to the conveyor adapted to engage the trip member when in its unloaded position and raise it to its loaded position, stop levers pivoted medially to the side frames, a stop bar united to the stop levers and extending transversely of the machine, trip levers rigidly united to the trip member and links connecting the stop levers to the trip levers.

5. A feeding appliance for bread slicing machines comprising a frame, a conveyor mounted in the frame, a chute leading to the conveyor suitably mounted upon the frame, a hinged trip member pivotally mounted upon the frame adjacent the lower end of the chute pivoted at a point spaced forward of the forward end of the chute and forming a continuation of the chute when in loaded position, means united to the conveyor adapted to engage the trip member when in its unloaded position and raise it to its loaded position, stop levers pivoted to the side frames, a stop bar united to the stop levers and extending transversely of the machine, trip levers rigidly united to the trip member and links connecting the stop levers to the trip levers.

6. A feeding appliance for bread slicing machines comprising a frame, a conveyor mounted in the frame, a chute leading to the conveyor suitably mounted upon the frame, a hinged trip member pivotally mounted upon the frame adjacent the lower end of the chute, forming a continuation of the chute when in loaded position, a plurality of arms united to the conveyor adapted to engage the trip member when in its unloaded position and raise it to the loaded position and means pivoted to the frame to detain a loaf of bread upon the trip member when in loaded position, and to release it as the trip member swings to its unloaded position.

7. A feeding appliance for bread slicing machines comprising a frame, a conveyor mounted in the frame, a chute sloping downwardly toward the conveyor suitably mounted upon the frame, a trip member pivotally mounted upon the frame adjacent the lower end of the chute, said trip member being pivoted at a point spaced forward of the lower end of the chute and forming a continuation of the chute when in horizontal position, and having its rear end recurved to form a stop, means united to the conveyor to successively engage the trip member when in its vertical position, raise it to a horizontal position, and then release it, stop levers pivoted medially to the side frames, a stop extending transversely of the machine and united to the stop levers, trip levers rigidly united to the trip member, links connecting the stop levers to the trip levers and means for driving the conveyor.

8. In a feeding appliance for bread slicing machines the combination with a frame of a conveyor mounted in the frame, a chute leading to a point above the conveyor, a hinged trip member pivotally mounted upon the frame adjacent the discharge end of the chute, a stop formed upon the rear of said trip member, means united to the conveyor adapted to engage the trip member when in its vertical position and raise it to a horizontal position, stop-levers pivoted to the side frames adapted to detain a loaf of bread upon the trip member when in horizontal position, a stop member extending transversely of the machine and united to the stop-levers, trip levers rigidly united to the trip member, links connecting the stop levers to the trip levers adapted to hold the stop member in position above the forward end of the trip member when in horizontal position and to move the stop member away from the trip member as the trip member swings to its vertical position and means for driving the conveyor.

9. In a feeding appliance for bread slicing machines the combination with a frame of a conveyor mounted in the frame, a chute leading to a point above the conveyor, a hinged trip member pivotally mounted upon the frame adjacent the discharge end of the chute, a stop formed upon the rear of said trip member, arms united to the conveyor adapted to successively engage the trip member when in its vertical position and raise it temporarily to a horizontal position, means to successively detain each oncoming loaf of bread upon the trip member and then to release it therefrom and means for driving the conveyor.

10. In a feeding appliance for bread slicing machines the combination with a frame of a conveyor mounted in the frame, a chute leading to a point above the conveyor, a hinged trip member pivotally mounted upon the frame adjacent the discharge end of the chute, means united to the conveyor adapted to engage the trip member when in its vertical position and raise it to a horizontal position, stop-levers pivoted to the side frames adapted to detain a loaf of bread upon the trip member when in horizontal position, a stop member extending transversely of the machine and united to the stop-levers, trip levers rigidly united to the trip member, links connecting the stop levers to the trip levers adapted to hold the stop member in position above the forward end of the trip member when in horizontal position and to move the stop member away from the trip member as the trip member swings to its vertical position and means for driving the conveyor.

11. In a feeding appliance for bread slicing machines the combination with a frame of a conveyor mounted in the frame, a chute leading to a point above the conveyor, a hinged trip member pivotally mounted upon the frame adjacent the discharge end of the chute, a stop adapted to detain each loaf of bread temporarily as it reaches the lower end of the chute, arms united to the conveyor adapted to successively engage the trip member when in its vertical position and raise it temporarily to a horizontal position, means to successively detain the successive loaves of bread upon the trip member and to release them therefrom and means for driving the conveyor.

12. In a feeding appliance for bread slicing machines the combination with a frame of a conveyor mounted in the frame, a chute leading to a point above the conveyor, a hinged trip member pivotally mounted upon the frame adjacent the discharge end of the chute, means to detain each loaf of bread temporarily as it reaches the lower end of the chute, arms united to the conveyor adapted to successively engage the trip member when in its vertical position and raise it temporarily to a horizontal position, means to detain the successive loaves of bread upon the trip member and to release them therefrom and means for driving the conveyor.

HARRY J. CRINER.
HARRY E. CRINER.